United States Patent [19]

Kufferath-Kassner

[11] 4,318,469

[45] Mar. 9, 1982

[54] WIRE MESH BAND

[75] Inventor: Karl Kufferath-Kassner, Duren-Mariaweiler, Fed. Rep. of Germany

[73] Assignee: GKD Gebr. Kufferath GmbH & Co. KG, Duren-Mariaweiler, Fed. Rep. of Germany

[21] Appl. No.: 107,921

[22] Filed: Dec. 28, 1979

[30] Foreign Application Priority Data

Jan. 11, 1979 [DE] Fed. Rep. of Germany ....... 2800871

[51] Int. Cl.³ .................... B65G 39/10; B65G 15/24
[52] U.S. Cl. .................................. 198/842; 198/844; 198/848
[58] Field of Search ............. 198/842, 844, 848, 840, 198/849, 847

[56] References Cited

U.S. PATENT DOCUMENTS 2,255,364  9/1941  Pink ..................................... 198/848
3,368,663  2/1968  Kufferath ........................... 198/840

Primary Examiner—Robert B. Reeves
Assistant Examiner—Brian Bond
Attorney, Agent, or Firm—Meyer, Tilberry & Body

[57] ABSTRACT

A wire mesh band or belt for a conveyor having downwardly extending protuberances for engaging peripheral grooves in rollers of a conveyor system to maintain the band in proper transverse position. The protuberances are formed on guide wires woven into the band at lateral and longitudinal intervals in the weft direction. The guide wires have at least one flattened surface so that they cannot rotate about their longitudinal axis. In a second embodiment, instead of continuous guide wires, a plurality of guide wire sections may be arranged at intervals transversely across the band.

6 Claims, 8 Drawing Figures

WIRE MESH BAND

The invention relates to a wire mesh band for an apparatus wherein the band travels in the direction of its warp wires over rotatable rollers, with wires extending transversely to the direction of travel of the band which exhibit protrusions extending beyond the underside of the fabric which engage into guide grooves on the circumference of the rollers.

Wire mesh bands of this type are used as conveyor belts for various goods in industry, particularly where hot goods or goods requiring drying have to be conveyed. These goods are also sometimes required to come into contact with air from beneath and therefore require a permeable support. Wire mesh bands are also suitable for use as support bands for travelling filter surfaces, or in double arrangement as a retaining device for substances which are required to be passed continuously through a treatment liquid.

A wire mesh band of the type initially explained is described in U.S. Pat. No. 3,368,663 wherein all the weft wires of the fabric have "V" shaped protrusions arranged at an interval of twice the warp pitch, which engage peripheral grooves of rollers so that the wire mesh band traveling over the rollers is guided laterally. Such wire mesh bands can only be constructed as wide-mesh fabrics in which the width of the meshes across the band is considerably greater than their length in the direction of travel of the band. Furthermore, a very large number of rows of protrusions distributed across the width of the band are obtained, for which a correspondingly large number of peripheral grooves must be provided in all the driving, supporting and return rollers of the apparatus over which the wire mesh band travels. The production of such grooves in the rollers involves substantial costs.

It is the aim of the invention to produce a wire mesh band which exhibits only a small number of protrusions across the width of the band on its underside. Also, only as many protrusions are arranged in a row in the longitudinal direction as is absolutely necessary for the guidance of the band.

This aim is achieved according to the invention in that the wires provided with protrusions are substantially rectilinear guide wires provided with at least one flattened part oriented in the weft direction and woven in at an interval of several meshes, which exhibit at least on protrusion bent beyond the underside of the fabric.

This configuration has the advantage that guidance of the band is possible not only with wide mesh fabrics, but pratically for any desired wire mesh, because the protrusions are provided, not in the regular weft wires, but in special guide wires which can be woven into any fabric including fabrics with square meshes or various other weave patterns. At the same time the proposed flattened part prevents the guide wires from rotating about their longitudinal axis in service. The protrusions of the guide wires therefore always stand perpendicularly to the plane of the mesh band.

The width of the guide wires is conveniently greater than the width or the diameter of the weft wires of the fabric. By this means a great rigidity of the fabric in the transverse direction is achieved in the case of fabrics made of thin wires. It is also ensured that the guide protrusions bent out of the guide wires are extremely robust providing a long service life for the wire mesh band.

The width of the guide wires may be equal to the interval of the weft wires in the fabric. An extremely firm binding of the guide wires is achieved by this means.

According to the invention the guide wires are conveniently of half-round or half-oval cross-section. Their half-round or half-oval surface is located on the underside of the fabric confronting the rollers, beyond which the protrusions project. With this cross-sectional shape of the guide wires, the protrusions have a domed or rounded surface in the direction of travel of the wire fabric band, so that they run into the peripheral grooves of the rollers particularly easily and thereby guide the band particularly well.

The guide wires may also have a rectangular cross-section and be rounded at their edges. Substantially the same effect as with half-oval cross-sections is achieved by this measure.

In the wire mesh band according to the invention, individual weft wires of the fabric may be replaced by woven-in guide wires with protrusions which then extend continuously across the total width of the wire fabric band and thereby not only assume the lateral guidance of the wire fabric band, but also simultaneously effectively stiffen the band in its transverse direction. In another embodiment the length of the guide wires may be shorter than the width of the wire fabric band. Such a construction is highly convenient where only one or two rows of protrusions in the center of the band are required in order to guide the band and the wire fabric band itself does not require stiffening in the transverse direction.

In the case of very wide wire fabric bands it may be convenient to arrange a plurality of short guide wire sections in a row in the transverse direction of the band so that the protrusions of each guide wire section align with the protrusions of the guide wire sections woven-in longitudinally behind them. The wire mesh band then has a plurality of rows of guide wire sections with one or more protrusions spaced along the band longitudinally.

The bent protrusions in the guide wires or guide wire sections are conveniently "V" shaped, and their base width conveniently corresponds to a multiple of the warp pitch. In this construction, a warp wire comes to lie in each case in the nip in which an arm of the "V" shaped protrusion bends out from the rectilinear part of the guide wire or of the guide wire section. The warp wires which lie in the region of the protrusions run continuously in the fabric, so that the fabric surface is not interrupted at the bends of the guide wires. This is important for sieve netting bands and other applications which must not exhibit large holes at individual points as is the case with the known wide-mesh fabrics. It may also be convenient in individual cases to produce the guide wires with the protrusions from a different material than the wires of the wire mesh band. For example, the guide wires may consist of brass or steel, whereas the wire mesh is woven entirely or partially from plstics wires. Obviously, it is also possible to produce the guide wires from an extremely tough plastic material, so that the entire wire mesh band is made of plastics. This may be advantageous where the wire mesh band according to the invention is used as a carrier band for substances which are required to be passed through a treatment liquid such as a concentrated acid, which strongly corrodes metal wires.

The invention may take physical form in certain parts and arrangements of parts, preferred embodiments of which will be described in detail in this specification and illustrated in the accompanying drawings which form a part hereof and wherein.

Figure 3:
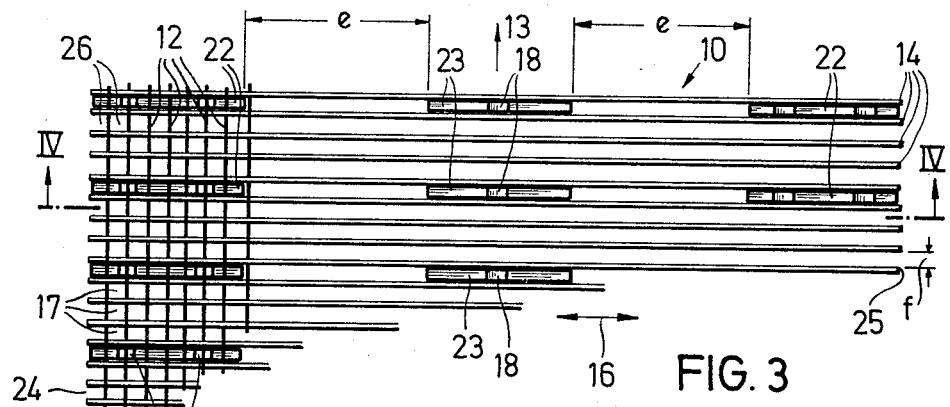
FIG. 3 shows a second embodiment of the wire mesh band according to the invention in a partial plan view similar to FIG. 1.
Figure 4:
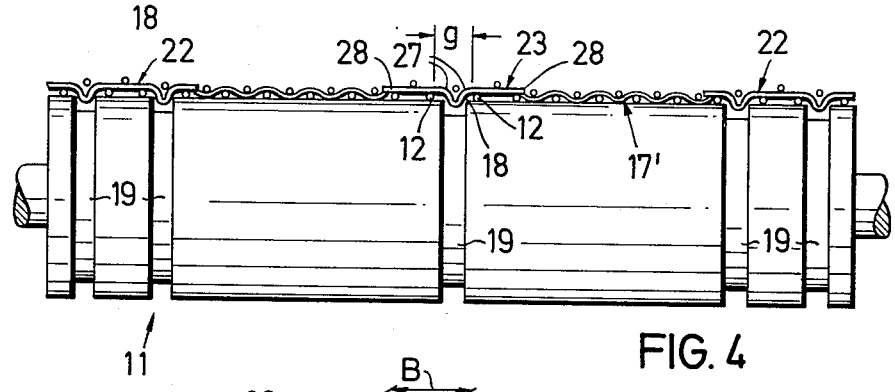
Figure 5:
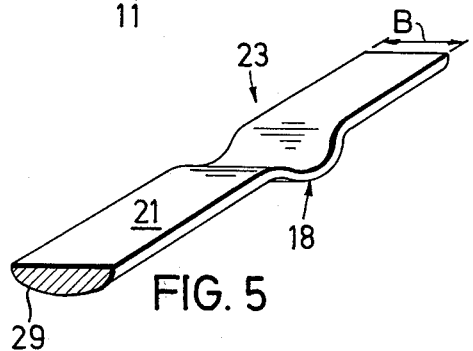
Figure 6:
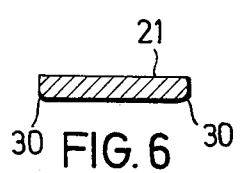
Figure 7:
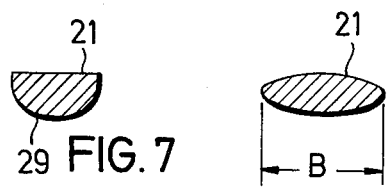
Figure 8:
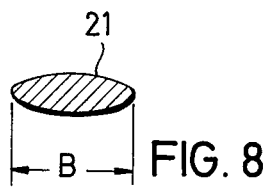

FIG. 4 shows the wire mesh band according to FIG. 3 in a cross-section made along the line 4—4 with a driving or return roller in elevation, upon which the wire mesh band rests, FIG. 5 shows one of the guide wire sections used in the wire mesh band according to FIGS. 3 and 4 in a perspective view and on a considerably larger scale; and, FIGS. 6 to 8 show various cross-sectional shapes for the guide wires used according to the invention.

Figure 2:
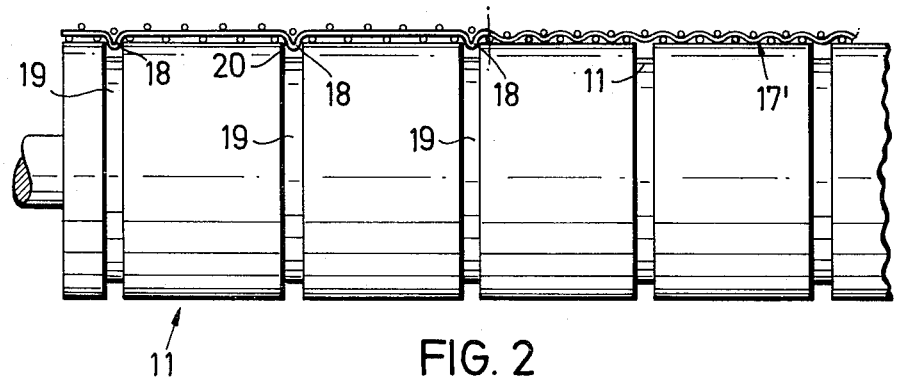
FIG. 2 shows the wire mesh band according to FIG. 1 in a cross-section made along the line 2—2 with a partial view of a support or return roller over which the wire mesh band travels.

In the drawings, 10 designates a wire mesh band for a conveyor apparatus. A support or return roller 11, over which the wire mesh band 10 travels, is illustrated in FIG. 2. The wire mesh band is constituted by a customary square mesh fabric, the comparatively thin and flexible warp wires 12 of which are woven with somewhat more rigid weft wires 14 extending transversely to the direction of travel 13 of the band 10.

According to the invention, approximately every tenth weft wire 14 is replaced by a guide wire 15 which is woven into the fabric in the weft direction 16 at an interval of ten meshes 17. Each guide wire 15 has five protrusions 18 (FIG. 2) arranged at lateral intervals and bent-out beyond the underside 17' of the fabric 10; said protrusions 18 engage into peripheral grooves 19 of the support or return roller 11 when the band 10 travels over said roller 11. If the band 10 has a tendency to wander sideways, i.e., to deviate from its straight direction of travel 13, it is repeatedly straightened in the region of the roller 11 because the protrusions 18 slip with their flanks 20 on the respective edges of the peripheral grooves 19 and into the latter.

In order that the guide wires 15 cannot rotate about their longitudinal axis, they have on their surface a flattened part 21, which need not absolutely be completely plane, but may also be slightly curved. For example, the guide wires may have the cross-section of a flat oval illustrated in FIG. 8.

Figure 1:
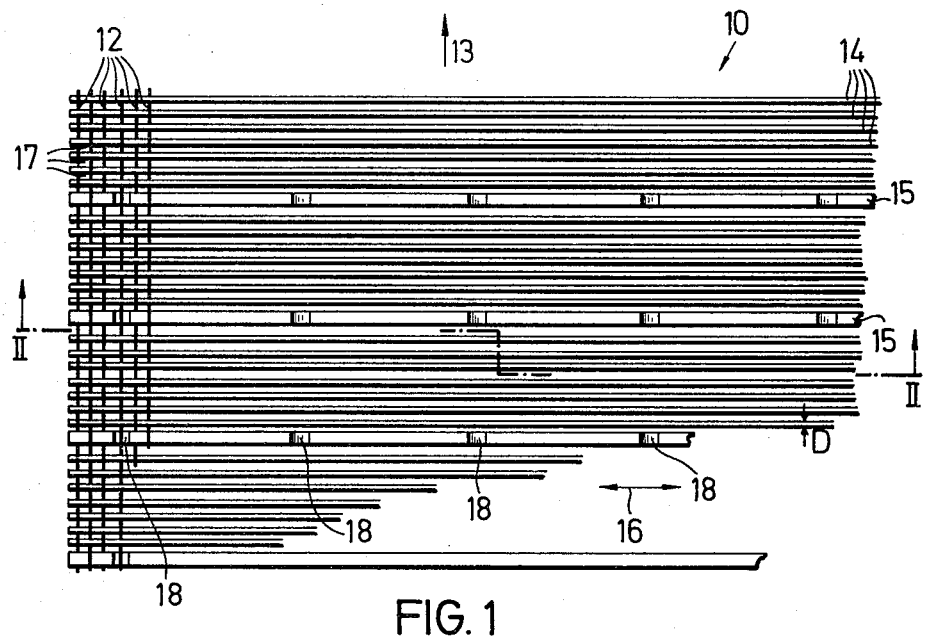
FIG. 1 shows a detail of a wire mesh band according to the invention in plan.

In the exemplary embodiment illustrated in FIGS. 1 and 2 the width B of the guide wires 15 is greater than the diameter D of the weft wires 14 of the fabric so that the wire fabric 10 is considerably stiffened in the weft direction 16 by the guide wires 15.

In the wire mesh band 10 illustrated in FIG. 3, instead of continuous guide wires 15, a plurality of short guide wire sections 22 and 23 are disposed in a row at a longitudinal interval "e" along the transverse or weft direction 16 of the band 10. Here guide wire section 22 with two protrusions 18 are present in the regions of the lateral edges 24 and 25 of the wire mesh band 10, and a short guide wire section 23 in the center of the wire mesh band 10. It will be seen from FIG. 3 that the transverse groups of guide wire sections 22 and 23 have a lateral or warp interval in each case of three meshes 17, and that the protrusions of all the guide wire sections 22 and 23 align in the warp direction.

The guide wire sections 22 and 23 have a width B which is equal to the interval "f" between two adjacent weft wires 14. The guide wire sections 22 and 23 are woven into the wire mesh fabric 10. They do not take the place of a weft wire 14, but lie between the latter.

It will be seen from FIG. 4 that the base width "g" of the protrusions 18 is dimensioned so that it corresponds to twice the warp pitch 26, that is, the mutual interval of the warp threads. Due to this, a warp wire 12 comes to lie in each case in the nips 27 which the "V" shaped protrusion 18 forms with the straight parts 28 of the guide wire sections 22 and 23. Consequently, the guide wire sections 22 and 23 cannot be displaced in the transverse direction 16 of the wire mesh band, in which they are tightly bonded.

In the exemplary embodiment illustrated in FIGS. 3 and 4 the guide wire sections 22 and 23 have a half-oval cross-section. In this case, the plane surface 21 is placed upwards in the wire mesh section, whereas its half-oval face 29 is located on the underside 17' confronting the roller 11. The protrusions 18 are therefore also bent outwards towards this oval surface 29 (FIG. 5).

Instead of the half-oval cross-section, the guide wire sections may also have the half-round cross-section illustrated in FIG. 7 or the rectangular cross-section shown in FIG. 6. The guide wires with rectangular cross-section are conveniently rounded at their edges.

The invention has been described in connection with preferred embodiments. Obviously, it is possible to arrange guide wire sections which may exhibit one or more protrusions only in the center of the wire mesh band. Moreover, the guide wires or guide wire sections may also be arranged at a greater or smaller mutual lateral interval. Instead of "V" shaped protrusions on the guide wires and rectangular cross-sectioned grooves in the rollers, U-shaped protrusions which travel in "V" shaped grooves in the rollers may also be provided. These and other modifications and variations will occur to others upon a reading of this specification. It is intended to include all such modifications and variations insofar as they come within the scope of the appended claims.

Having thus described the invention, I claim:

1. In a woven wire mesh band having longitudinal warp wires and transverse weft wires for use in conveyors or the like wherein said band travels in the direction of its warp wires over rotatable rollers, the improvement which comprises: guide wires having a flattened surface, an arcuate surface opposite said flattened surface and a width greater than the width or diameter of said weft wires woven transversely into said band with said arcuate surface located on the underside of said band confronting said rollers, said guide wires having protrusions extending beyond the underside of said band adapted to engage in guide grooves on the circumference of said rollers.

2. The improvement of claim 1, wherein said guide wires have rectangular cross-sections with rounded corners.

3. A conveyor system comprising a plurality of support rollers; circumferential guide grooves in at least one of said rollers, and a woven wire mesh band having longitudinal warp wires and transverse weft wires travelling longitudinally and supported by said rollers, said band having a plurality of guide wires having a flattened surface, an arcuate surface opposite said flattened surface and a width parallel to said flattened surface much greater than perpendicular to said flattened surface woven into said band in a transverse direction and spaced longitudinally along said band with said arcuate surface positioned to engage said rollers and said guide grooves, each guide wire having at least one protrusion extending beyond the underside of said band, said protrusions positioned transversely to form at least one longitudinally aligned row of protrusions along said band engaging said guide grooves and thereby transversely positioning said band.

4. The combination of claim 3 wherein said guide wires have a width greater than the diameter of said weft wires.

5. The combination of claim 4 wherein a plurality of sets of guide wires are woven into said band, said sets being spaced from one another longitudinally along said band and each set being arranged colinearly transversely across said band such that such protuberances form longitudinally aligned rows.

6. The combination of claim 5 wherein said protrusions are "V" shaped and said guide grooves are rectangular.

* * * * *